(12) United States Patent
Evans

(10) Patent No.: US 10,378,859 B2
(45) Date of Patent: Aug. 13, 2019

(54) HARMONIC SHUTTER RESOLVER ALGORITHM FOR MULTIMODE SEEKER

(71) Applicant: Rosemount Aerospace Inc., Burnsville, MN (US)

(72) Inventor: Owen Daniel Evans, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 261 days.

(21) Appl. No.: 15/452,214

(22) Filed: Mar. 7, 2017

(65) Prior Publication Data
US 2018/0259297 A1    Sep. 13, 2018

(51) Int. Cl.
| F41G 7/22 | (2006.01) |
| G01S 17/66 | (2006.01) |
| F41G 7/26 | (2006.01) |
| G01S 7/486 | (2006.01) |

(52) U.S. Cl.
CPC ............ *F41G 7/226* (2013.01); *F41G 7/2293* (2013.01); *F41G 7/26* (2013.01); *G01S 7/4861* (2013.01); *G01S 7/4865* (2013.01); *G01S 17/66* (2013.01)

(58) Field of Classification Search
CPC .......... F41G 7/226; F41G 7/2293; F41G 7/26; G01S 7/4861; G01S 7/4865; G01S 17/66
See application file for complete search history.

(56) References Cited

U.S. PATENT DOCUMENTS

| 4,020,339 | A | * | 4/1977 | Gustafson | F41G 7/26 244/3.13 |
| 5,023,888 | A | * | 6/1991 | Bayston | F41G 7/226 342/189 |
| 6,111,241 | A | | 8/2000 | English et al. | |
| 6,262,800 | B1 | | 7/2001 | Minor | |
| 6,987,256 | B2 | | 1/2006 | English et al. | |
| 7,911,375 | B2 | | 3/2011 | Winstead et al. | |
| 8,164,037 | B2 | | 4/2012 | Jenkins et al. | |
| 8,946,647 | B2 | | 2/2015 | Cloud et al. | |
| 9,207,053 | B2 | | 12/2015 | Eli et al. | |
| 2010/0127113 | A1 | | 5/2010 | Taylor et al. | |
| 2013/0153745 | A1 | | 6/2013 | Schmitt et al. | |
| 2015/0268345 | A1 | | 9/2015 | Ell | |
| 2015/0362290 | A1 | | 12/2015 | Ell | |

OTHER PUBLICATIONS

Extended European Search Report for EP Application No. 18158842.7, dated Aug. 16, 2018, 7 Pages.

* cited by examiner

*Primary Examiner* — Georgia Y Epps
*Assistant Examiner* — Don J Williams
(74) *Attorney, Agent, or Firm* — Kinney & Lange, P.A.

(57) ABSTRACT

A multimode seeker includes an imager and an image processor. The imager is configured to capture image data received by the multimode seeker during a search period and a track period, wherein the search period includes a plurality of search cycles, and wherein a duration of each of the plurality of search cycles is equal to a predetermined pulse period plus a predetermined drift period. The image processor is configured to detect at least one laser candidate based upon the image data and to track the least one candidate laser during the track period.

14 Claims, 3 Drawing Sheets

HARMONIC SHUTTER RESOLVER ALGORITHM FOR MULTIMODE SEEKER

BACKGROUND

The present application relates generally to multimode seekers, and in particular to an algorithm for detecting and tracking laser pulses.

Seeker guided ordinances may be launched or dropped some distance away from a target, then guided to the target, saving a delivery vehicle from having to travel into the area of the target. Seekers perform target detection and tracking by sensing energy such as sound, radio frequency, infrared, or visible energy that targets emit or reflect. Seeker systems that detect and process one type of energy are known generally as single-mode seekers, while seeker systems that detect and process multiples types of energy are generally known as multimode seekers.

Seeker homing techniques can be classified as active, semi-active, and passive. In active seekers, a target is illuminated and tracked by equipment onboard the ordnance itself. A semi-active seeker is one that detects and follows a target by tracking energy from an external source, separate from the ordnance, and reflected by the target. The illuminating source can be ground-based or airborne. Semi-active and active seekers require the target to be continuously illuminated until target impact. Passive seekers use external, uncontrolled energy sources such as solar light or target emitted heat. Because semi-active seekers involve a separate, external source, this source can also be used to "designate" the correct target. In this scenario, the ordnance "acquires" and "tracks" the designated target.

In semi-active laser (SAL) seeker guidance systems, an operator points a laser designator at the target, and the laser radiation bounces off the target and scatters in multiple directions. The laser designator may emit the laser at a predetermined pulse repetition frequency (PRF) so that a seeker system is able to identify the reflected laser. When the ordnance is close enough for some of the reflected laser energy from the target to reach the ordnance's field of view (FOV), a seeker system of the ordnance detects and identifies the laser energy. The seeker determines that the detected laser energy has the PRF assigned by the designator and determines the direction from which the energy is being reflected. This allows the ordnance to guide itself accurately to the target. It is desirable to optimize the laser acquisition process in order to improve the overall functionality and maneuverability of the seeker system.

SUMMARY

A method of detecting laser pulses having a predetermined pulse period by a multimode seeker includes capturing image data, by the multimode seeker, during a search period, wherein the search period includes a plurality of search cycles, and wherein a duration of each of the plurality of search cycle is equal to the predetermined pulse period plus a predetermined drift period; detecting, from the image data, at least one laser candidate; and tracking, by the multimode seeker, the at least one candidate laser during a track period.

A multimode seeker includes an imager and an image processor. The imager is configured to capture image data received by the multimode seeker during a search period and a track period, wherein the search period includes a plurality of search cycles, and wherein a duration of each of the plurality of search cycles is equal to a predetermined pulse period plus a predetermined drift period. The image processor is configured to detect at least one laser candidate based upon the image data and to track the at least one candidate laser during the track period.

DETAILED DESCRIPTION

A multimode seeker is disclosed herein that utilizes a harmonic shuttering resolver algorithm to detect and track reflected laser pulses. The algorithm includes capturing image data using expose pulses during a search period, and dynamically controlling an expose pulse during a track period. The search period includes a plurality of capture cycles in which images are captured during the expose pulses. The duration of each capture cycle is equal to a predetermined pulse period plus a predetermined drift period. The predetermined pulse period may be equal to a pulse repetition interval (PRI) for a laser that the multimode seeker is attempting to track. The predetermined drift period may be selected to ensure that any drift of the target laser occurs in a known direction between consecutive cycles. During the search period, the multimode seeker searches for, and detects, laser pulses. During the track period, each detected laser goes through an evaluation period. During the evaluation period, each of the laser pulses found during the search period are evaluated to determine if the laser pulse corresponds to the desired target laser. During the synchronized tracking period, each target laser that was confirmed during the evaluation period is tracked by the multimode seeker.

Figure 1:
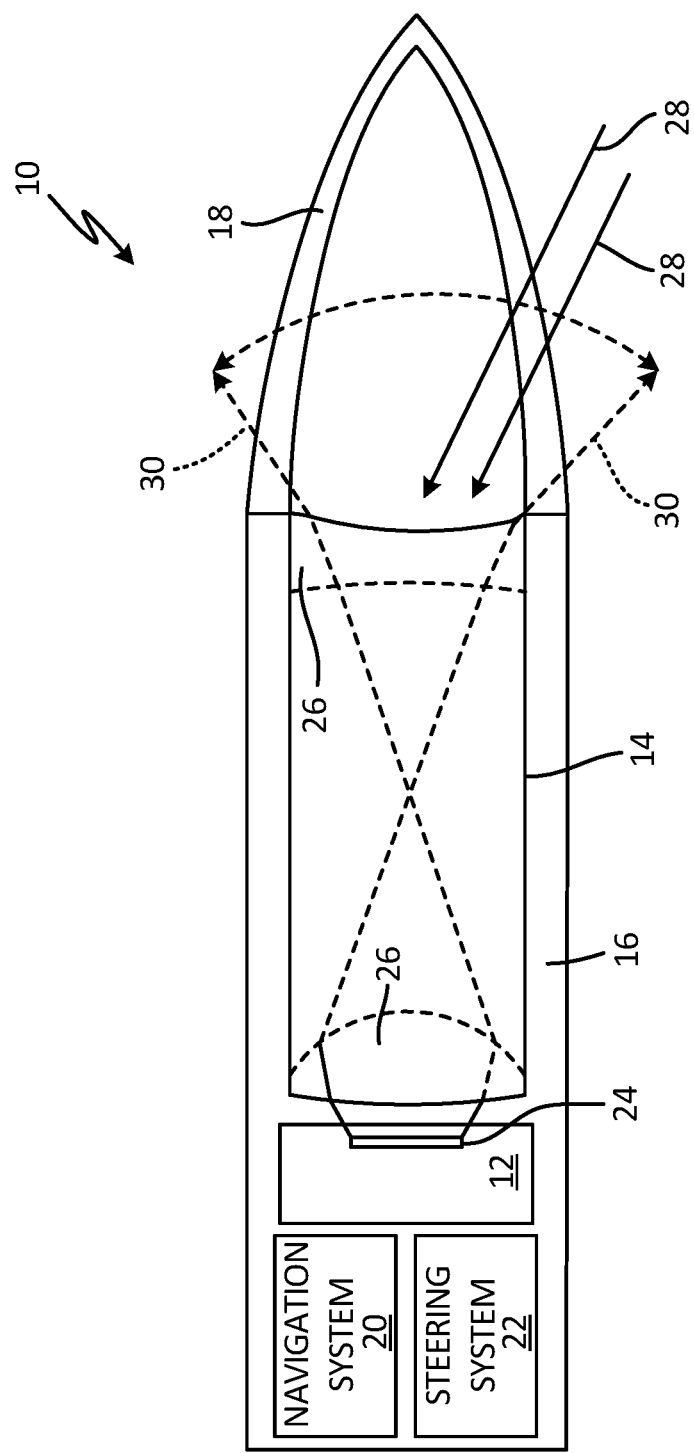
FIG. 1 is a block diagram of a multimode seeker.

FIG. 1 is a block diagram illustrating a multimode seeker 10. Multimode seeker 10 may be configured to acquire and process images in order to generate target directional information. Multimode seeker 10 includes image processor 12, optical system 14, projectile body 16, dome 18, navigation system 20 and steering system 22. Image processor 12 may be configured to receive and process image data from focal plane array (FPA) 24. Optical system 14 includes lenses 26 configured to receive energy 28 from field-of-view 30 through dome 18, and direct and focus energy 28 to FPA 24. Multimode seeker 10 may be an imaging semi-active laser (ISAL) seeker configured to support multimode and multi-homing operation. FPA 24 may be configured to be sensitive to shortwave infrared (SWIR) energy to facilitate the multimode and multi-homing operation. While illustrated as a focal plane array, FPA 24 may be replaced or supplemented by any other device capable of capturing laser and/or image data.

FPA 24 may include a large array of photo-diode detection circuits and be configured as sensitive to typical wavelengths of laser target designators. Navigation system 20 and steering system 22 may utilize data from image processor 12, for example, along with other data such as GPS, telemetry, etc., to determine and implement the appropriate adjustment to the flight path of multimode seeker 10 to guide seeker 10 to a target. Image processor 12, navigation system 20 and steering system 22 may all be implemented on the same chip or on different chips.

Image processor 12 may include a combination of hardware, firmware and software. Scheduling complexity of image processor 12 may depend upon photo-diode detection circuitry and associated read-out channel capabilities of FPA 24. Shutter control logic of image processor 12 for FPA 24 may receive timing information, imager configuration data, and frame attributes that identify and control frame processing after an image is acquired by FPA 24. The shutter control logic may fill in image metadata for each captured image that may be used by image processor 12 for peak-to-side-lobe (PSL) determination, for example.

Image processor 12 may also include a readout integrated circuit (ROIC), for example, to convert incoming energy 28 to electrical signals that can be read out, processed and/or stored. Image processor 12 may implement Harmonic shuttering logic (HSL) to search for, and track, reflected laser energy from laser target designators. The ROIC may generate trigger signals to control a shutter expose timing of FPA 24. The ROIC may require a "dark time" between each expose pulse. The dark time is the time between the inactive edge of an expose pulse and the active edge of a subsequent expose pulse (shown in FIG. 2). The amount of dark time needed is based on the circuit switching time, conversion time, readout time and expose time of the subsequent expose pulse.

Figure 2:
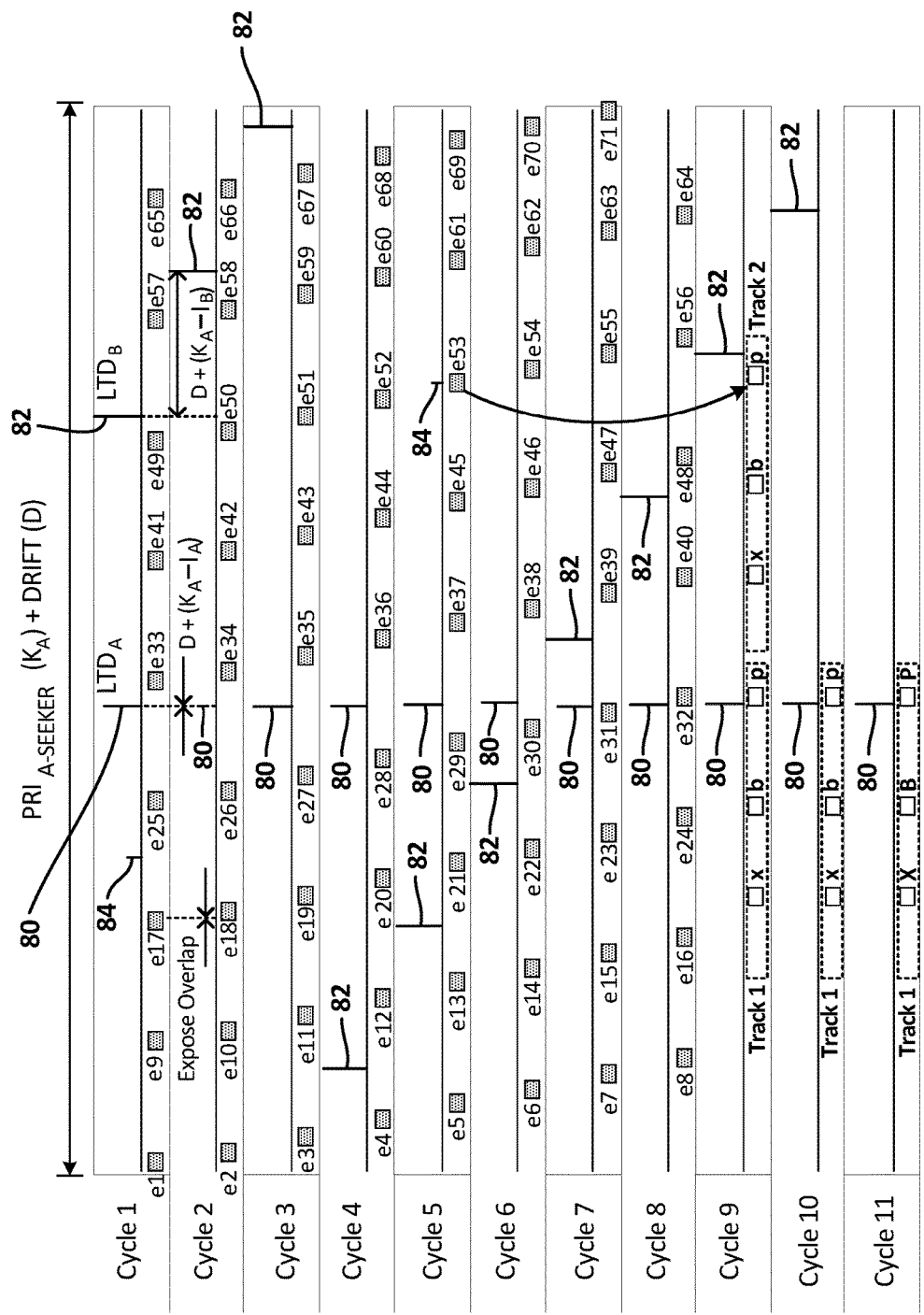
FIG. 2 is a timing diagram for a harmonic shuttering algorithm for a multimode seeker.

FIG. 2 is a timing diagram for a harmonic shuttering resolver (HSR) algorithm for multimode seeker 10. The HSR algorithm may be executed by image processor 12 to search for, and track, laser pulses. Cycles 1-8 comprise a search period, and cycles 9-11 comprise a track period. While illustrated as 11 cycles, several more cycles may be included in the track period beyond cycle 11. Illustrated in the timing diagram are laser pulses 80 and 82, and noise pulses 84. Laser pulses 80 correspond to a laser that is illuminating a target A and laser pulses 82 correspond to a laser that is illuminating a target B. Two Tracks 1 and 2 are illustrated in cycles 9-11. Tracks 1 and 2 are evaluated in cycles 9 and 10. Track 1 is confirmed and synchronized in cycle 11. Track 2 is dropped after evaluation in cycle 9. Details of track generation and behavior are described below with respect to FIG. 3.

The seeker time base ($K_A$) for multimode seeker 10 may be set, for example, to match the pulse repetition interval (PRI) for target A. The time period of each cycle 1-11 may be equal to the seeker time base $K_A$ plus a drift time (D). Drift time D serves to force the expected laser pulses 80 to drift to the left (in other embodiments, drift time D may be configured to force the expected laser pulses 80 to drift to the right). For target A, the calibration timing error between the seeker time base $K_A$ and the laser target designator (LTD) time base ($I_A$) is ($K_A-I_A$). As long as drift time D exceeds the calibration error ($K_A-I_A$) between seeker 10 and the LTD for target A, the laser pulses 80 will drift left relative to the expose pulses e1-e71 with an offset of $D+(K_A-I_A)$. A secondary LTD, which may be illuminating target B with a higher PRI ($I_B$) than target A, is illustrated by laser pulses 82. Pulses 82 "walk" through successive cycles 1-11 with a timing offset of $D+(K_A-I_B)$ relative to the cycle time. Significant noise pulses 84 are illustrated in cycles 1 and 5.

During the search period, expose pulses e1-e71 are illustrated. The dark time, as discussed above, is illustrated as the horizontal gap between successive expose pulses e1-e71. The expose pulses e1-e71 slightly overlap between successive cycles 1-8 (e.g., expose pulses e17 and e18) in order to address the photodiode response near the edges of the expose pulse. Expose pulse e32 illustrates a true detection of laser pulse 80, expose pulse e53 illustrates a false detection of noise pulse 84, and all other expose pulses e1-e71 illustrate no detections. The detection in e32 creates Track 1 and the detection in e53 creates Track 2. Evaluation track expose pulses for Tracks 1 and 2 are identified as ex, eb and ep. Synchronized track expose pulses for Track 1 are identified as eX, eB and eP.

During the evaluation period (cycles 9 and 10), expose pulses ex, eb and ep are illustrated for Track 1 and Track 2. During the synchronized period (cycle 11), track pulses eX, eB and eP are illustrated for Track 1. Detecting laser pulses 80 and 82 during the search period may be accomplished using a peak-to-side-lobe (PSL) analysis. For each search cycle, the PSL may be calculated for each expose pulse e1-e71 using the equation: $PSL_n=(metric_n/lobe\ estimate)$. The lobe estimate is intended to represent the effective image noise floor (an image without a laser pulse 80 and 82). It is calculated using, for example, the metric data added to each image by image processor 12.

Tracks 1 and 2 are shown in cycles 9-11. Each track sequence includes three successive expose pulses (ex, eb and ep for evaluation and eX, eB and eP for synchronization), in order to generate the image metric dataset needed to control state behavior. The image metric may be the maximum image difference between successive image frames (i.e., images obtained during each expose pulse). Therefore, three successive expose pulses generate two image metrics (the first metric between the first and second pulses ex and eb, and the second metric between the second and third pulses eb and ep). The time interval between successive expose pulses is constrained by the minimum dark time required by the hardware, but the additional constraint of the harmonic search pattern seen in cycles 1-8 is removed. Therefore, this expose pulse time interval will generally decrease in transitioning from the search period to the track period. In addition, the expose pulse phase and width can be dynamically changed, which is illustrated between e1-e71 and the track expose pulses ex, eb and ep.

Synchronized tracks (e.g., Track 1 in cycle 11) are evaluated against a configurable designator code sequence. For pulse repetition interval (PRI) codes, a single persistent track is expected (e.g., pulses 80). However, by using the harmonic shuttering resolver algorithm, multiple laser pulses may be detected simultaneously. Because of this, pulse interval modulation (PIM) codes may be detected by seeker 10. For PIM codes, a sequence of persistent tracks with a specific timing interval relationship is expected. For example, for a PIM code, another set of pulses would be found at a specific timing interval from pulses 80 (e.g., during expose pulse e63). If a match to a designator code sequence is found, the synchronized track is considered locked which triggers processing for output. The directional information is computed and reported to navigation system 20 and guidance system 22.

Figure 3:
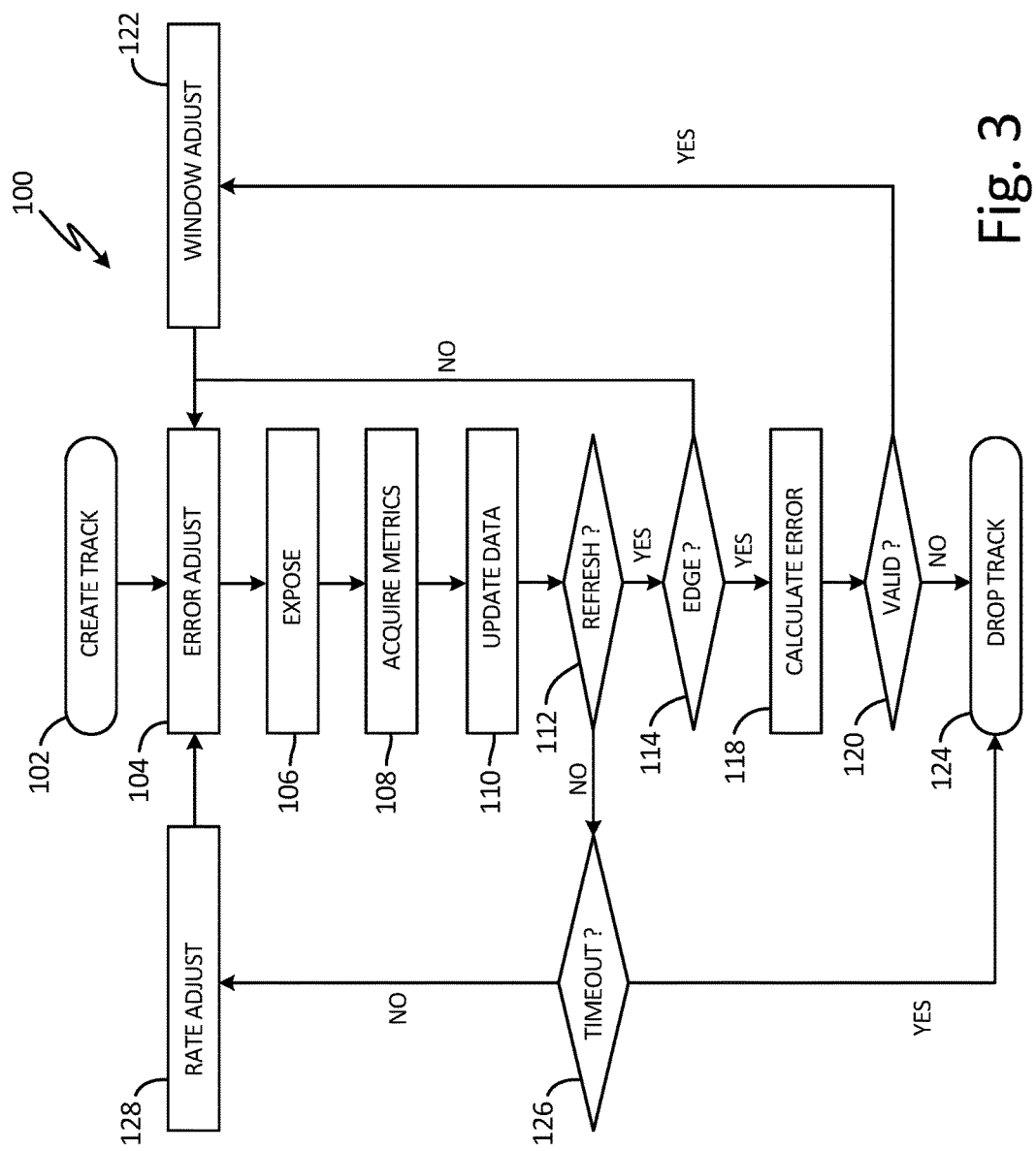
FIG. 3 is a flowchart illustrating a method of performing laser tracking for a multimode seeker.

With continued reference to FIG. 2, FIG. 3 is a flowchart illustrating method 100 of performing laser tracking for multimode seeker 10. At step 102, for each search pattern (cycles 1-8 of FIG. 2), a track is created for "bin n" (e.g., the expose pulse e1-e71 plus respective dark time illustrated in FIG. 2) based on, for example, the search criteria listed in Table 1. In the embodiment shown in FIG. 2, tracks are created for expose pulses e32 (Track 1) and e53 (Track 2). When a track is created, the track timing is initialized from the timing of the source search bin, and is extended by a configurable lead time and lag time to accommodate timing uncertainty.

TABLE 1

| Description | Expression |
| --- | --- |
| PSL for bin n exceeds a configurable create threshold. | $PSL_n >$ threshold |
| PSL for bin n is the local resolved peak PSL | $PSL_n > PSL_{n-1}$<br>$PSL_n >= PSL_{n+1}$ |
| PSL for bin n is significant relative to the global peak PSL | $PSL_n > (PSL_{max} *$ fraction$)$ |
| The maximum number of tracks has not been reached | Track count $<$ track max |

The local resolved peak PSL applies to cases in which laser energy may be present in adjacent bins. For each track, an expose sequence (ex, eb and ep) is generated unless the necessary track sequences overlap (e.g., laser pulses detected in e13 and e15). Thus, adjacent bins lead to a dilemma due to their inherent overlap. Because of this, it is important to select the best candidate. This case can occur if the laser timing happens to occur in the search bin overlap (e.g., right edge of expose pulse e13 and left edge of expose pulse e14). Either bin selection may work for creating a track sequence, but the peak selection may be the best choice since the PSL indicates that the potential laser energy is most likely temporally closer to the bin containing the peak. This case can also happen if the laser source is very bright (e.g. close range) because the photodetector response may be much broader due to the extreme laser pulse amplitude. The peak selection may also be the best option to encapsulate the true center of the laser energy. This case could also happen if a noise pulse or secondary designator pulse happens to occur close to the actual designator pulse. The PSL for the bin containing the laser energy would be expected to be greater than the PSL for the bin containing a noise pulse. For a case in which a secondary designator pulse is present, the peak selection could result in selecting the incorrect bin. Since the PRI of the secondary designator will differ from the seeker time base, the track would be dropped during the evaluation period. Another search pattern (e.g., cycles 1-8) would then trigger a track with the actual designator. While this scenario still results in detection of the laser pulses 80, it comes with the penalty of a longer time to lock onto the target.

The global peak PSL criterion can be used to remove unlikely tracks from consideration with the potential benefit of improving the time to lock. Each track requires an expose sequence (ex, eb and ep) to be generated. If these sequences overlap, the sequences need to be multiplexed over multiple cycles, which extends the time to complete an evaluation of all generated tracks.

At step 104, the phase of the expose pulse is adjusted by a current drift rate estimate in order to attempt to keep laser pulse 80, for example, in the same relative position within the expose pulse ep for the next track sequence. The current drift rate estimate may be made by image processor 12 in an attempt to compensate for the drift error $(K_A - I_A)$. This estimate may be made in step 118 for tracks that have completed multiple tracking cycles. When a track is first created, the drift error is unknown and set to zero.

At step 106, the three expose pulses (ex, eb and ep) are performed for the respective track. At step 108, metric data is acquired by image processor 12 based upon the three expose pulses. At step 110, after the new metric data is acquired, the PSL is calculated based on the new metric data. At step 112, tracks are considered refreshed if the PSL calculated at step 110 exceeds a configurable refresh threshold which indicates that laser energy is still present in the target peak frame (ep). If the track is refreshed, method 100 proceeds to step 118. If the track is not refreshed, method 100 proceeds to step 126.

At step 114, it is determined if the detected laser pulse is at an edge of the expose pulse ep. If the laser pulse is not at the edge of expose pulse ep, method 100 returns to step 104. If the laser pulse is at the edge of the expose pulse ep, method 100 proceeds to step 118. At step 118, the drift error and PRI error are calculated. The drift error is used to adjust the timing phase for each expose sequence (ex, eb and ep).

At step 120, it is determined if the track is still valid. This may be determined, for example, if the PRI error exceeds a threshold for a configurable number of cycles. At step 124, if the track is determined to not be valid, the track is dropped. At step 122, if the track is valid, the track window (e.g., timing of expose pulses ex, eb and ep) is adjusted and another measurement cycle is started at step 104. Track state information is updated based on persistent refresh events (at step 112). When the persistence count reaches a configurable threshold, the track state changes from evaluation to synchronized. For example, for the embodiment shown in FIG. 2, the persistence count reaches two after cycle 10 and the track is synchronized for cycle 11. Target lock is established based on a comparison of synchronized tracks with configurable code definition. For a PRI code, the definition is one synchronized track. For a PIM code, the definition is a specific number of synchronized tracks with a specific timing interval between the tracks. If a match is found, lock is established. For the embodiment in FIG. 2, lock is established in cycle 11 for pulse 80. Target lock triggers processing for output to guidance, navigation and control systems.

In addition to PSL, data for resolving laser timing is updated at step 104 in subsequent cycles and analyzed based on new metric data obtained in step 108. When the track is created in step 102, the expose pulse ep is extended by a lead time that allows for a minimum number of track cycles before laser pulse 80 is expected to drift to the edge of the expose pulse ep. After enough metric data is buffered (each cycle at step 108), a rolling average of the peak metric data is initialized and maintained by image processor 12. The maximum average may be scaled by a configurable fraction to determine a threshold level, which may be used as a reference for subsequent metric data in resolving the laser timing. When new metric data obtained at step 108 persistently falls below the threshold level for a configurable number of cycles, the laser timing is expected to be located close to the left edge of the expose pulse ep. However, the drift rate of the laser timing is still unknown. By adjusting the phase by a measurement window in step 122, the laser timing is shifted to the right. When the laser timing reaches the left edge for subsequent cycles, the drift rate per PRI cycle can be calculated by dividing the measurement window by the number of cycles it took for laser pulse 82 to drift over the entire measurement window.

At step 126, for tracks that are not refreshed, it is determined if a timeout has occurred. The timeout may be set to any number of cycles. During the evaluation period, the timeout may be set to a low value so that inconsistent tracks (e.g. noise, false designators) are dropped quickly. During the track synchronization period, the timeout may be set to a higher value to support various concepts of operation for seeker 10. For example, maneuvers may be necessary to purposely, but temporarily, place the target outside of the field-of-view of seeker 10

If a timeout has not yet occurred, at step 128, a rate adjustment is performed for the respective track. The adjustment is a scale factor of the current drift rate estimate with a goal of moving the laser pulse slightly to the right relative to the expose pulse ep of the previous cycle. This step is important to handle the case of overshooting the left edge of the expose pulse so that evidence of a refresh may be possible. If a timeout has occurred, method 100 proceeds to step 124 and the track is dropped.

By utilizing the HSR algorithm, seeker 10 is able to decrease the seeker acquisition time over previous harmonic shuttering algorithms. This helps the laser designator operators avoid detection by enemy forces, for example. Additionally, the target update rate can be increased, which facilitates better ordnance maneuverability and accuracy. The HSR algorithm also allows multiple laser pulses to be resolved simultaneously, which enables the acquisition of additional designator coding techniques such as pulse interval modulation (PIM).

Discussion of Possible Embodiments

The following are non-exclusive descriptions of possible embodiments of the present invention.

A method of detecting laser pulses having a predetermined pulse period by a multimode seeker includes capturing image data, by the multimode seeker, during a search period, wherein the search period includes a plurality of search cycles, and wherein a duration of each of the plurality of search cycle is equal to the predetermined pulse period plus a predetermined drift period; detecting, from the image data, at least one laser candidate; and tracking, by the multimode seeker, the at least one candidate laser during a track period.

The method of the preceding paragraph can optionally include, additionally and/or alternatively, any one or more of the following features, configurations and/or additional components:

A further embodiment of the foregoing method, wherein capturing image data during the search period includes executing a plurality of search expose cycles at a predetermined duty cycle, each of the plurality of search expose cycles including a search expose pulse during which the image data is captured and a dark time during which the image data is not captured.

A further embodiment of any of the foregoing methods, wherein detecting, from the image data, the at least one candidate laser includes performing, by an image processor, a peak-to-side-lobe analysis for the image data of each of the plurality of expose cycles; and determining the at least one candidate laser pulse based upon the peak-to-side-lobe analysis of the image data.

A further embodiment of any of the foregoing methods, wherein tracking, by the multimode seeker, the at least one candidate laser includes evaluating, by an image processor, the at least one candidate laser; and locking, by the multimode seeker, the at least one candidate laser as a tracked laser.

A further embodiment of any of the foregoing methods, wherein evaluating, by the image processor, the at least one candidate laser includes executing, for at least one evaluation cycle, a set of evaluation expose cycles, each evaluation expose cycle including at least two evaluation expose pulses and at least one evaluation dark time between the at least two evaluation expose pulses; and confirming the at least one candidate laser based upon the at least two evaluation expose cycles.

A further embodiment of any of the foregoing methods, wherein confirming the at least once candidate laser includes using peak-to-side-lobe analysis on evaluation image data captured during the at least two evaluation expose pulses.

A further embodiment of any of the foregoing methods, wherein locking, by the multimode seeker, the at least one candidate laser as a tracked laser includes confirming, during a synchronized tracking period, the at least one candidate laser as the tracked laser.

A further embodiment of any of the foregoing methods, wherein confirming, during the synchronized tracking period, the at least one candidate laser as a tracked laser includes executing, for at least one synchronized cycle, a set of synchronized expose cycles, each synchronized expose cycle including at least two synchronized expose pulses and at least one synchronized dark time between the at least two synchronized expose pulses; determining, during the at least one synchronized cycle, that the candidate laser is at an edge of one of the at least two synchronized expose pulses; and adjusting a subsequent one of the at least one synchronized cycles if the candidate laser pulse is at the edge of the one of the at least two synchronized expose pulses.

A further embodiment of any of the foregoing methods, wherein confirming, during the synchronized tracking period, the at least one candidate laser as a tracked laser further includes estimating, by the image processor, an estimated laser drift period, wherein the laser drift period is a difference between the duration of the at least one synchronized cycle and a pulse repetition interval of the candidate laser pulse.

A further embodiment of any of the foregoing methods, wherein confirming, during the synchronized tracking period, the at least one candidate laser as a track laser further includes adjusting a timing and phase of the at least two synchronized expose pulses of a subsequent one of the at least one synchronized cycles based upon the estimated laser drift period.

A multimode seeker includes an imager and an image processor. The imager is configured to capture image data received by the multimode seeker during a search period and a track period, wherein the search period includes a plurality of search cycles, and wherein a duration of each of the plurality of search cycles is equal to a predetermined pulse period plus a predetermined drift period. The image processor is configured to detect at least one laser candidate based upon the image data and to track the at least one candidate laser during the track period.

The multimode seeker of the preceding paragraph can optionally include, additionally and/or alternatively, any one or more of the following features, configurations and/or additional components:

A further embodiment of the foregoing multimode seeker, wherein the search period includes plurality of search expose cycles executed at a predetermined duty cycle, and wherein each of the plurality of search expose cycles includes a search expose pulse during which the image data is captured by the imager and a dark time during which the image data is not captured by the imager.

A further embodiment of any of the foregoing multimode seekers, wherein the image processor is further configured to perform a peak-to-side-lobe analysis on the image data of each of the plurality of expose cycles and detect the at least one candidate laser pulse based upon the peak-to-side-lobe analysis of the image data.

A further embodiment of any of the foregoing multimode seekers, wherein the track period includes an evaluation period and a synchronized period, wherein the image processor is configured to evaluate the at least one candidate laser pulse during the evaluation period and to lock the at least one candidate laser as a tracked laser during the synchronized period.

A further embodiment of any of the foregoing multimode seekers, wherein the evaluation period includes at least one evaluation expose cycle, and wherein each of the at least one evaluation expose cycles includes at least two evaluation expose pulses and at least one evaluation dark time between the at least two evaluation expose pulses, and wherein the image processor is configured to confirm the at least one candidate laser based upon evaluation image data captured by the imager during the at least two evaluation expose cycles.

A further embodiment of any of the foregoing multimode seekers, wherein image processor is configured to perform peak-to-side-lobe analysis on the evaluation image data.

A further embodiment of any of the foregoing multimode seekers, wherein the image processor is configured to lock the candidate laser pulse as the tracked laser during the synchronized period.

A further embodiment of any of the foregoing multimode seekers, wherein the image processor is configured to execute a set of synchronized expose cycles during the synchronized period, and wherein each of the synchronized expose cycle includes at least two synchronized expose pulses and at least one synchronized dark time between the at least two synchronized expose pulses, and wherein the image processor is configured to determine that the candidate laser is at an edge of one of the at least two synchronized expose pulse and adjust a subsequent one of the at least one synchronized cycles if the candidate laser pulse is at the edge of the one of the at least two synchronized expose pulses.

A further embodiment of any of the foregoing multimode seekers, wherein the image processor is further configured to estimate an estimated laser drift period, wherein the laser drift period is a difference between the duration of the at least one synchronized cycle and a pulse repetition interval of the candidate laser pulse, and wherein the image processor is further configured to adjust a timing and phase of the at least two synchronized expose pulses of a subsequent one of the at least one synchronized cycles based upon the estimated laser drift period.

A further embodiment of any of the foregoing multimode seekers, wherein the imager comprises a focal plane array.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of detecting laser pulses having a predetermined pulse period by a multimode seeker, the method comprising:
    capturing image data, by the multimode seeker, during a search period, wherein the search period includes a plurality of search cycles, and wherein a duration of each of the plurality of search cycle is equal to the predetermined pulse period plus a predetermined drift period, including
        executing a plurality of search expose cycles at a predetermined duty cycle, each of the plurality of search expose cycles including a search expose pulse during which the image data is captured and a dark time during which the image data is not captured;
    detecting, from the image data, at least one laser candidate, including
        performing, by an image processor, a peak-to-side-lobe analysis for the image data of each of the plurality of expose cycles; and
        determining the at least one candidate laser pulse based upon the peak-to-side-lobe analysis of the image data; and
    tracking, by the multimode seeker, the at least one candidate laser during a track period including evaluating, by an image processor, the at least one candidate laser; and
        locking, by the multimode seeker, the at least one candidate laser as a tracked laser.

2. The method of claim 1, wherein evaluating, by the image processor, the at least one candidate laser comprises:
    executing, for at least one evaluation cycle, a set of evaluation expose cycles, each evaluation expose cycle including at least two evaluation expose pulses and at least one evaluation dark time between the at least two evaluation expose pulses; and
    confirming the at least one candidate laser based upon the at least two evaluation expose cycles.

3. The method of claim 2, wherein confirming the at least once candidate laser includes using peak-to-side-lobe analysis on evaluation image data captured during the at least two evaluation expose pulses.

4. The method of claim 1, wherein locking, by the multimode seeker, the at least one candidate laser as a tracked laser comprises confirming, during a synchronized tracking period, the at least one candidate laser as the tracked laser.

5. The method of claim 4, wherein confirming, during the synchronized tracking period, the at least one candidate laser as a tracked laser comprises:
    executing, for at least one synchronized cycle, a set of synchronized expose cycles, each synchronized expose cycle including at least two synchronized expose pulses and at least one synchronized dark time between the at least two synchronized expose pulses;
    determining, during the at least one synchronized cycle, that the candidate laser is at an edge of one of the at least two synchronized expose pulses; and
    adjusting a subsequent one of the at least one synchronized cycles if the candidate laser pulse is at the edge of the one of the at least two synchronized expose pulses.

6. The method of claim 5, wherein confirming, during the synchronized tracking period, the at least one candidate laser as a tracked laser further comprises:
    estimating, by the image processor, an estimated laser drift period, wherein the laser drift period is a difference between the duration of the at least one synchronized cycle and a pulse repetition interval of the candidate laser pulse.

7. The method of claim 6, wherein confirming, during the synchronized tracking period, the at least one candidate laser as a track laser further comprises:
    adjusting a timing and phase of the at least two synchronized expose pulses of a subsequent one of the at least one synchronized cycles based upon the estimated laser drift period.

8. A multimode seeker comprising:
an imager configured to capture image data received by the multimode seeker during a search period and a track period, wherein the search period includes a plurality of search cycles, and wherein a duration of each of the plurality of search cycles is equal to a predetermined pulse period plus a predetermined drift period and wherein the search period includes plurality of search expose cycles executed at a predetermined duty cycle, and wherein each of the plurality of search expose cycles includes a search expose pulse during which the image data is captured by the imager and a dark time during which the image data is not captured by the imager; and
an image processor configured to detect at least one laser candidate based upon the image data and to track the at least one candidate laser during the track period and to perform a peak-to-side-lobe analysis on the image data of each of the plurality of expose cycles and detect the at least one candidate laser pulse based upon the peak-to-side-lobe analysis of the image data, wherein the track period includes an evaluation period and a synchronized period, wherein the image processor is configured to evaluate the at least one candidate laser pulse during the evaluation period and to lock the at least one candidate laser as a tracked laser during the synchronized period.

9. The multimode seeker of claim 8, wherein the evaluation period includes at least one evaluation expose cycle, and wherein each of the at least one evaluation expose cycles includes at least two evaluation expose pulses and at least one evaluation dark time between the at least two evaluation expose pulses, and wherein the image processor is configured to confirm the at least one candidate laser based upon evaluation image data captured by the imager during the at least two evaluation expose cycles.

10. The multimode seeker of claim 9, wherein image processor is configured to perform peak-to-side-lobe analysis on the evaluation image data.

11. The multimode seeker of claim 8, wherein the image processor is configured to lock the candidate laser pulse as the tracked laser during the synchronized period.

12. The multimode seeker 11, wherein the image processor is configured to execute a set of synchronized expose cycles during the synchronized period, and wherein each of the synchronized expose cycle includes at least two synchronized expose pulses and at least one synchronized dark time between the at least two synchronized expose pulses, and wherein the image processor is configured to determine that the candidate laser is at an edge of one of the at least two synchronized expose pulse and adjust a subsequent one of the at least one synchronized cycles if the candidate laser pulse is at the edge of the one of the at least two synchronized expose pulses.

13. The multimode seeker of claim 12, wherein the image processor is further configured to estimate an estimated laser drift period, wherein the laser drift period is a difference between the duration of the at least one synchronized cycle and a pulse repetition interval of the candidate laser pulse, and wherein the image processor is further configured to adjust a timing and phase of the at least two synchronized expose pulses of a subsequent one of the at least one synchronized cycles based upon the estimated laser drift period.

14. The multimode seeker of claim 8, wherein the imager comprises a focal plane array.

* * * * *